United States Patent [19]

Midorikawa

[11] 4,104,781
[45] Aug. 8, 1978

[54] METHOD OF MANUFACTURING A MARKING PEN HAVING A NIB AND AN INK RESERVOIR INTEGRAL THEREWITH

[75] Inventor: Yoshio Midorikawa, Tokyo, Japan

[73] Assignee: Glasrock Products, Inc., Fairburn, Ga.

[21] Appl. No.: 694,524

[22] Filed: Jun. 10, 1976

[51] Int. Cl.² .............................................. B23P 17/00
[52] U.S. Cl. .................................. 29/419 R; 401/196;
401/198; 264/263; 264/267; 264/DIG. 77;
264/136; 264/137
[58] Field of Search ................ 29/419; 264/46.9, 46.4,
264/136, 137, DIG. 77, 263, 267; 401/196, 198,
199

[56] References Cited

U.S. PATENT DOCUMENTS

| 3,400,998 | 9/1968 | Daugherty et al. | 401/198 |
| 3,432,446 | 3/1969 | Coppeta | 401/199 |
| 3,502,417 | 3/1970 | Hartmann | 401/195 X |
| 3,864,183 | 2/1975 | Hori | 401/198 |
| 3,881,828 | 5/1975 | Jones | 401/199 |

FOREIGN PATENT DOCUMENTS

| 800,211 | 12/1968 | Canada | 401/198 |
| 1,418,087 | 10/1965 | France | 401/199 |
| 1,561,844 | 4/1970 | Fed. Rep. of Germany | 401/198 |
| 26,687 | 11/1969 | Japan | 401/198 |

*Primary Examiner*—C. W. Lanham
*Assistant Examiner*—V. Rising
*Attorney, Agent, or Firm*—Lane, Aitken, Dunner & Ziems

[57] ABSTRACT

A fibre bundle is first formed from loosely entangled fibres. A sheath is formed over the fibre bundle and one end is dipped into an urethane prepolymer to fill the spaces among fibres with the urethane prepolymer. After removal from the prepolymer it is left to stand for a period of time during which the constituents in the urethane prepolymer react to form polyurethane and generate carbon dioxide gas which forms many capillary passages for the transudation of ink. By grinding the dipped end a marking pen is obtained having a nib and an ink reservoir integral therewtih.

3 Claims, 5 Drawing Figures

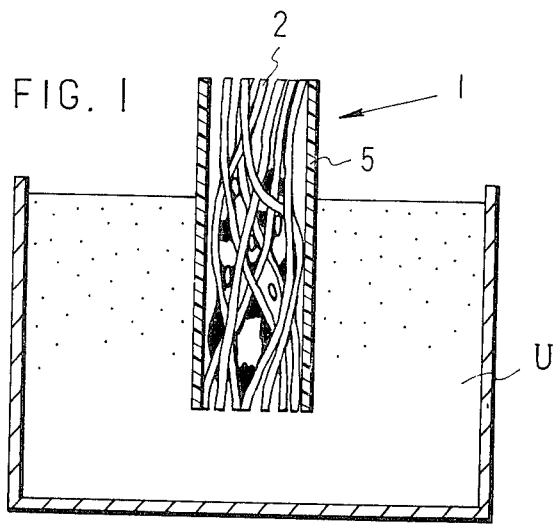
FIG. 1
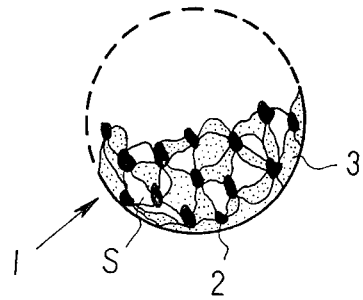
FIG. 4
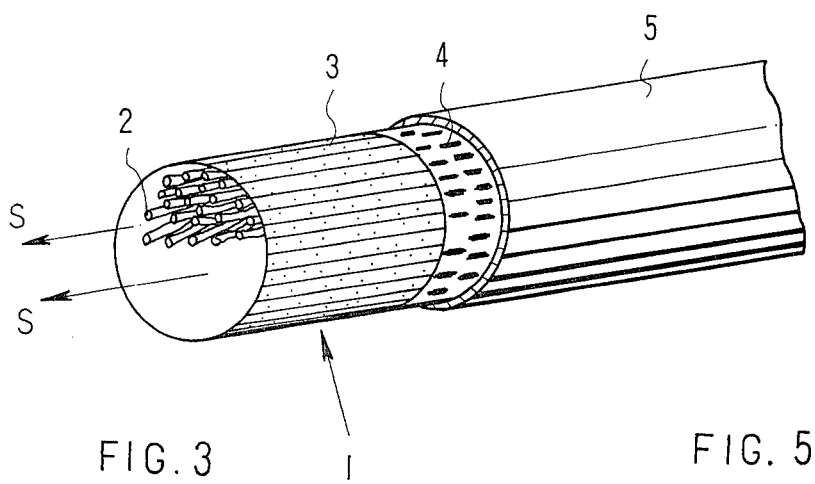
FIG. 2
FIG. 3
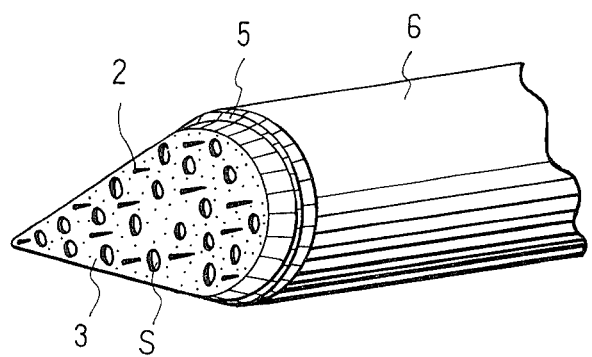
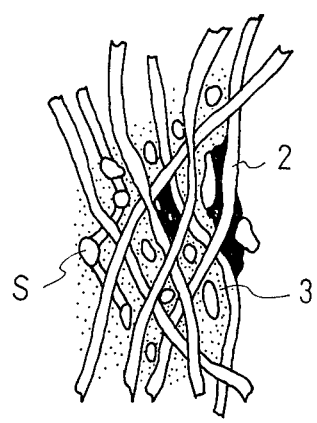
FIG. 5

METHOD OF MANUFACTURING A MARKING PEN HAVING A NIB AND AN INK RESERVOIR INTEGRAL THEREWITH

CROSS-REFERENCE TO RELATED APPLICATIONS

This application is related to the following copending applications: U.S. Ser. No. 694,525, filed June 10, 1976, entitled "METHOD FOR MANUFACTURING A MARKING PEN HAVING A NIB AND AN INK RESERVOIR INTEGRAL THEREWITH"; U.S. Ser. No. 665,622, filed Mar. 10, 1976, entitled "CAPILLARY BODY AND METHOD OF PRODUCING THE SAME"; and U.S. Ser. No. 702,067, filed July 2, 1976, entitled "A METHOD FOR PRODUCING A WRITING PEN CORE HAVING A NIB PORTION INTEGRAL WITH AN INK RESERVOIR".

BACKGROUND OF THE INVENTION

The present invention relates to method of manufacturing a marking pen having a nib and an ink reservoir integral therewith and consisting of a plastic encased fibre bundle.

DESCRIPTION OF THE PRIOR ART

A conventional marking pen has been produced by a method wherein a fibre bundle and a nib are made separately, and then they are joined together for ink transudation action. Such a method requires a troublesome joining operation which is expensive and not always satisfactory.

SUMMARY OF THE INVENTION

The object of the present invention is to provide method of manufacturing a marking pen in which there is no need for the joining operation by the integral formation of a nib and an ink reservoir.

The another object of the present invention is to provide a method of manufacturing a cheaper and more effective marking pen.

The above objects are, in accordance with the present invention, accomplished by a method comprising the steps of forming a fibre bundle of loosely entangled fibres, covering the bundle with a plastic shell dipping one end portion into an urethane prepolymer, bundle polymerizing the prepolymer thereby forming very small passages in the resultant polyurethane substantially longitudinally of said fibre bundle by carbon dioxide gas generated during the setting of the polyurethane.

BRIEF DESCRIPTION OF THE DRAWING

FIG. 1 is a longitudinal cross section of the fibre bundle with its forward end portion being dipped into the urethane prepolymer;

FIG. 2 is a perspective view of the pen body with the outer shell partially cut away;

FIG. 3 is a perspective view of the marking pen manufactured according to method of the present invention;

FIG. 4 is a cross sectional view of the nib; and

FIG. 5 is a longitudinal cross section of the nib.

DESCRIPTION OF THE EMBODIMENTS

First, the fibre bundle 1 is formed from loosely entangled fibres 2 as by an extruder. Then the fibre bundle 1 is coated or covered with a coating 5 and/or an outer shell 6 of a suitable plastic which is preferably vinyl chloride. The fibre bundle with the coating etc. thereon is then cut to a predetermined length.

Then, as shown in FIG. 1, one end of the fibre bundle is dipped into an urethane prepolymer $u$ dissolved in a solvent which is preferably a hydrocarbon chloride. Thereafter it is taken out of the urethane prepolymer and left for a while as it is. At that time it is preferably heated, for example, in an oven at a temperature of preferably 40° to 80° C. During the period of time left standing, the urethane prepolymer undergoes a polymerization reaction to form polyurethane 3, and becomes set progressively, and at the same time the solvent is volatilized. If necessary, the fibre bundle is heated as stated above in the oven to promote of solvent and the setting of the resultant polyurethane 3.

During the setting of the urethane the reaction of OH groups of co-existing water ($H_2O$) with excessive isocyanate in the urethane prepolymer generates carbon dioxide gas which, as it escapes, is guided by the coating and/or outer shell substantially in the direction shown in FIG. 2 along small spaces produced due to the volatilization of the solvent. Thus, as the resultant urethane 3 sets, in a manner shown in FIG. 4 small spaces S are formed among fibres 2 along gas escape routes and the fibres 2 are joined together to form a nib with capillary passages S therein for the transudation of ink 4.

The subsequent machining or grinding of the urethane prepolymer treated fibre bundle provides the nib with the shape of cone as shown in FIG. 3. The ink 4 contained in the ink reservoir integral with the nib transudates smoothly through said capillary passages S at a proper rate for both continuous and intermittent writing, because the capillary passages have very complicated configurations.

Because the nib thus manufactured is formed with the fibres 2 and heat set urethane plastic 3, it has moderate elasticity for writing, and possesses tear-resistant and wear-resistant properties.

In Table I below is shown one example of a composition for the urethane prepolymer which has found to give very good results.

Table I

Polyol: 100 (weight ratio)
Isocyanate: 45 (weight ratio)
Water ($H_2O$); 4 (weight ratio)

However, the ratio of polyol is isocyanate may be selected according to the number of polyol and is isocyanate groups. Preferably they provide a high molecular weight material providing the nib with elasticity, wear-resistance and tear-resistance.

I claim:

1. A method for producing a writing nib having an integral ink reservoir comprising:
   (a) forming a plurality of fibers into a fiber bundle;
   (b) forming a sheath around the outer periphery of said fiber bundle;
   (c) dipping one end of the sheathed fiber bundle into a mixture of urethane prepolymer, water and a solvent for said prepolymer; then
   (d) polymerizing said prepolymer in said sheathed bundle whereby the gases generated by reaction and by volatilization of the solvent form capillary passages substantially longitudinally of said bundle; and
   (e) after the polymer has set, grinding the dipped end into the form of a cone.

2. The method of claim 1 wherein said urethane prepolymer contains an isocyanate and a polyol.

3. The method of claim 1 wherein said prepolymer impregnates only a first portion of the length of said fiber bundle, a second, unimpregnated portion forming the ink reservoir.

* * * * *

UNITED STATES PATENT AND TRADEMARK OFFICE
CERTIFICATE OF CORRECTION

PATENT NO. : 4,104,781
DATED : August 8, 1978
INVENTOR(S) : YOSHIO MIDORIKAWA

It is certified that error appears in the above—identified patent and that said Letters Patent are hereby corrected as shown below:

Column 1, line 29, delete "action";

line 45, delete "bundle".

Column 2, line 12, after "promote" insert --volatilization--;

line 42, delete "is" and insert --to--;

line 43, delete "is".

Signed and Sealed this

Twenty-ninth Day of May 1979

[SEAL]

Attest:

RUTH C. MASON
*Attesting Officer*

DONALD W. BANNER
*Commissioner of Patents and Trademarks*